March 8, 1966  J. E. LAMKIN  3,239,063
WATER SOFTENING APPARATUS
Filed June 12, 1961  2 Sheets-Sheet 1
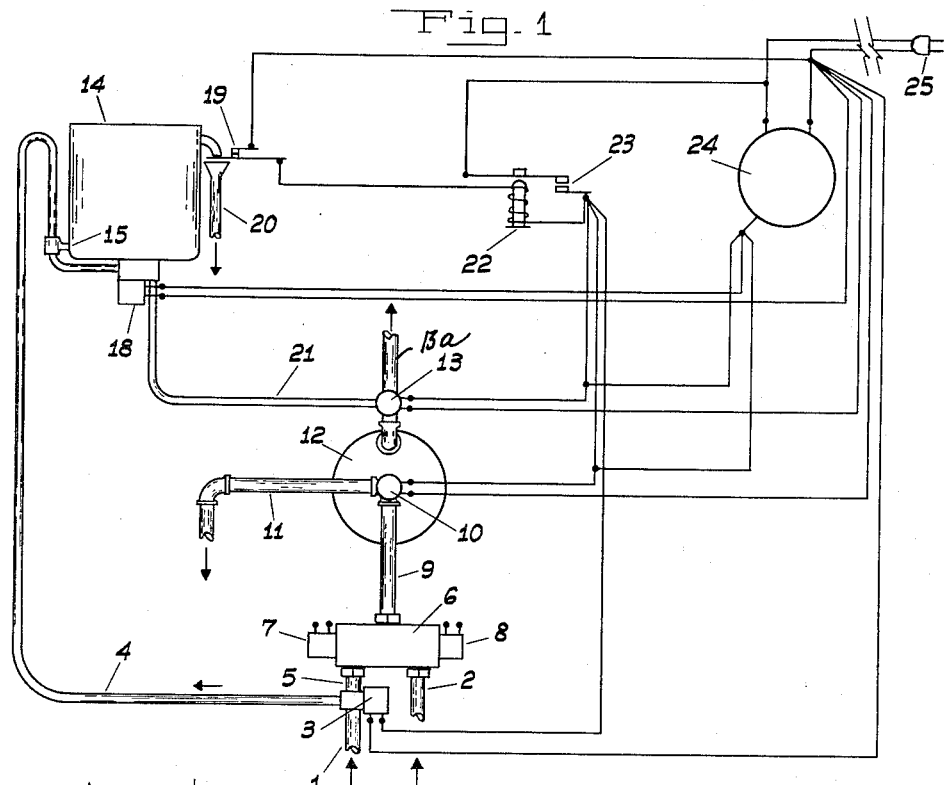
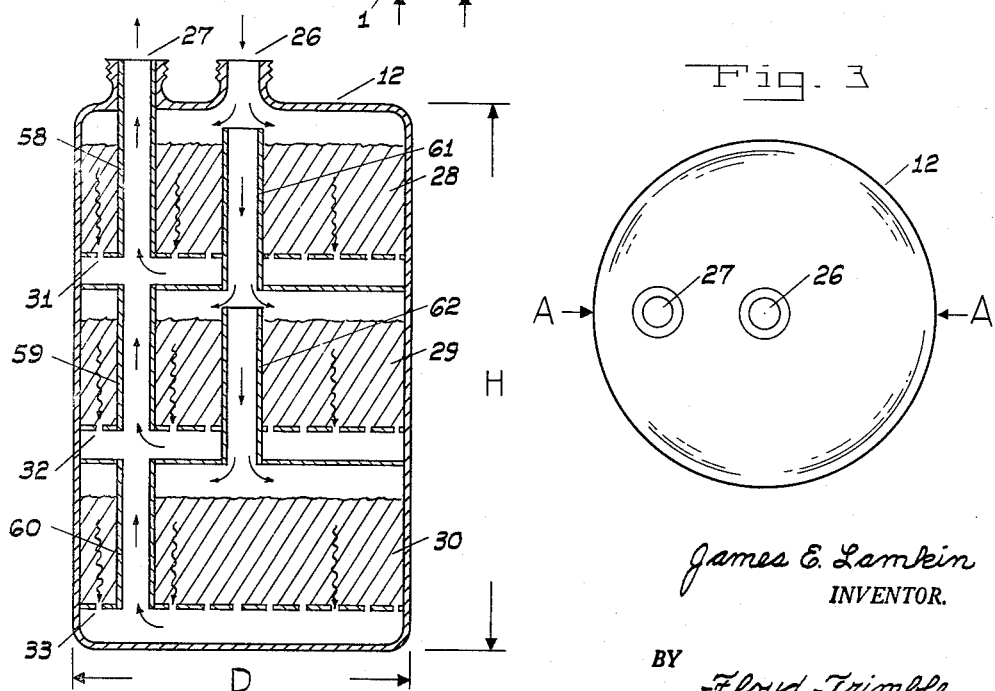
James E. Lamkin
INVENTOR.
BY Floyd Trimble
Attorney March 8, 1966   J. E. LAMKIN   3,239,063
WATER SOFTENING APPARATUS
Filed June 12, 1961   2 Sheets-Sheet 2
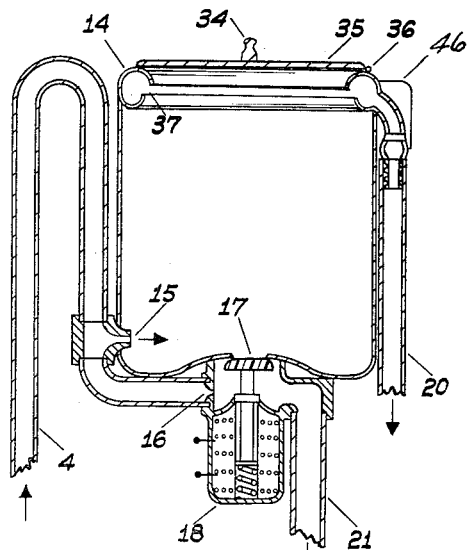
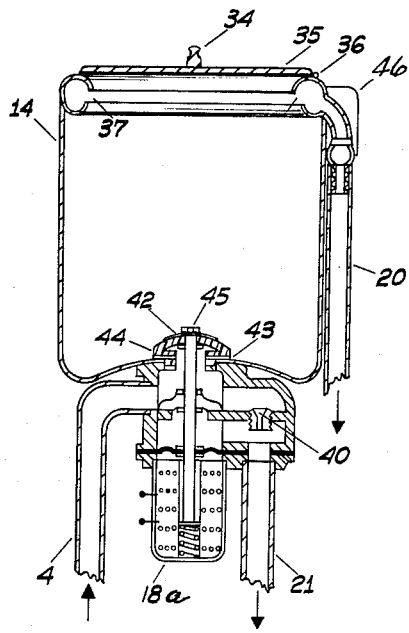
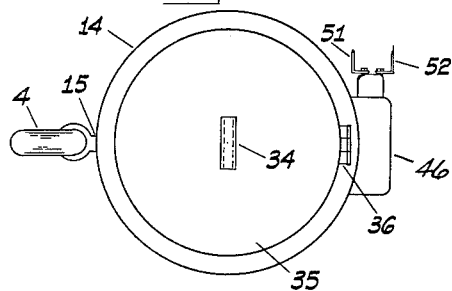
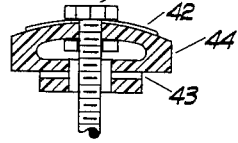
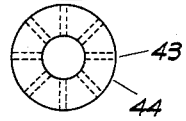
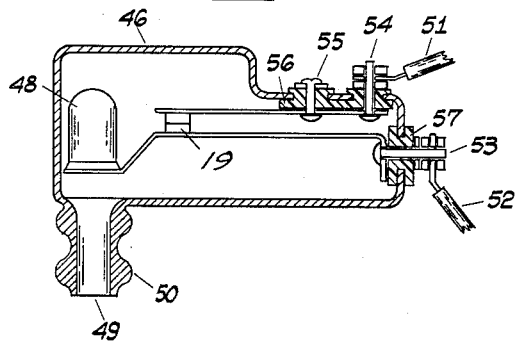
James E. Lamkin
INVENTOR.
BY Floyd Trimble
Attorney United States Patent Office 3,239,063
Patented Mar. 8, 1966

1

3,239,063
WATER SOFTENING APPARATUS
James E. Lamkin, Tulsa, Okla., assignor of thirty-five percent to Wiley W. Lowrey, Jr., and William M. Majors, Jr., and five percent to Marion E. Lamkin, all of Oklahoma City, Okla.
Filed June 12, 1961, Ser. No. 116,559
2 Claims. (Cl. 210—98)

This invention relates to the art of water softening and more particularly it relates to an improved apparatus for use in softening water. Even more particularly, it relates to an improved ion exchange device whereby the water may be softened economically and efficiently.

As is well known to those skilled in the art, all water from whatever source contains certain materials as impurities which make the water more or less hard. This is true even of rain water. This hardness varies from less than one grain for rain water to many grains per gallon for water from numerous wells. It is also well known that hardness in water is objectionable not only because of economics, but such water is unhealthful as well. Because of the numerous advantages of soft water over hard water, various methods have been proposed for softening water. These methods have included the employment of certain compositions which may be added directly to the water by the consumer and those employing an ion exchange material. In the latter method which is more satisfactory, the calcium and magnesium ions (the cause of hardness in water) are exchanged for sodium ions. The ultimate result is that calcium and magnesium salts are converted to sodium salts. Although the use of an ion exchange resin as heretofore employed is the preferred method of the two, it is not entirely satisfactory. That is true because the ion exchange resin becomes exhausted after a certain volume of water flows through it and must be regenerated. The latter is accomplished by treating the exhausted resin with a sodium chloride solution followed by washing with fresh water to remove excess sodium chloride. Such a procedure is rather complicated and time consuming. Another serious disadvantage of the apparatus heretofore used to soften water resides in the bulkiness and the expense of the equipment previously deemed essential to accomplish the desired results.

It is, therefore, a principal object of this invention to provide an improved water softening apparatus whereby the disadvantages of the apparatus used in the prior art for softening water are obviated.

It is another object of my invention to provide a water softening apparatus whereby the water softening process is conducted in a simple and economical manner.

It is another object of the present invention to provide a water softening apparatus that is highly efficient in operation.

Other objects and advantages of the present invention will become apparent as the following description proceeds.

To the accomplishment of the foregoing and related ends, said invention, then, comprises the features hereinafter fully described and particularly pointed out in the claims, the following description and the annexed drawings in which like numerals are employed to designate like parts throughout, setting forth in detail certain illustrative embodiments of the invention, these being indicative, however, of but a few of the various ways in which the principle of the invention may be employed.

In said annexed drawings:

2

FIGURE 1 shows, schematically, the water softening apparatus including necessary appurtenances such as the controls for the valving means and an electrical circuit diagram;

FIGURE 2 is an elevational, cross-sectional view of the water softening tank taken along the line of A—A of FIGURE 3;

FIGURE 3 is a top plan view of the tank of FIGURE 2;

FIGURE 4 is an elevational, cross-sectional view, on an enlarged scale, of the salt storage tank or hopper and appurtenances attached thereto constructed in accordance to one aspect of the invention;

FIGURE 5 is a top plan view of the storage tank of FIGURE 4;

FIGURE 6 is an elevational, cross-sectional view, on an enlarged scale, of the salt storage tank and appurtenances attached thereto constructed in accordance to another aspect of the invention;

FIGURE 7 is an elevational, cross-sectional view, on an enlarged scale, of the backwash and brine supply valve used in FIGURE 6;

FIGURE 8 illustrates the hole pattern in the supply valve of FIGURE 7; and,

FIGURE 9 is an elevational, cross-sectional view, on an enlarged scale, of the overflow switch.

Broadly stated, the foregoing objects and advantages are attained by employing a water softening apparatus comprising a tank of relatively small size which contains the ion exchange resin or composition in a plurality of beds connected in parallel and a salt supply hopper. A system of conduits and necessary valves are so interconnected with the timer of a household appliance such as an automatic washing machine, dish washer or similar device that the control of the water softening, regeneration, and backwashing cycles are regulated thereby. It will, of course, be obvious to those skilled in the art the employment of the ion exchange resin in a plurality of beds connected in parallel increases the effective cross-sectional area and insures that the contact time of the hard water with the ion exchange resin will be the same as in a bed of much larger diameter.

Referring to the drawings in detail and to FIGURE 1 in particular, there is shown a source of hard water by the numerals 1 and 2. A two-way valve and control indicated in general by the numeral 3 provides the means by which the flow of hard water may be directed to flow through pipe 4 to the salt hopper 14, through orifice 15, and also provides water for back wash to tank 12. Controls 7 and 8 are adapted to regulate valve 6 which may be rotated to allow hard water to flow into tank 12 through a pipe 9 from either line 2 or line 5, or it may be rotated so that the flow of hard water to tank 12 from either of these two lines is completely shut off.

As pointed out above and as illustrated in FIGURE 2, tank 12 contains the ion exchange resin in a plurality of beds connected in parallel indicated by the numerals 28, 29, and 30. These beds are supported on perforated plates 31, 32, and 33. Although in this figure I illustrate the use of three beds, it should be understood, of course, that two or more such beds may be used if desired. Generally a plurality of more than three beds is not desirable since the costs of preparing a tank having a greater number increases rapidly with no corresponding beneficial results. When the apparatus is used for softening water, the hard water flows into tank 12 through opening 26 and flows through that tank in the general direction indicated by the arrows in FIGURE 2. On entering the tank through opening 26 the stream of water will divide, part flowing through ion exchange resin bed 28 and part through the pipe leading to resin bed 29. That portion of the water flowing through resin bed 28 passes through the perforations in plate 31 and then out through the pipe leading to exit 27. The hard water flowing through the pipe extending through bed 28 also divides into two streams part flowing through resin bed 29, and part through the pipe extending through resin bed 29. As above that portion flowing through the resin bed passes through the perforations in plate 32 and to the exit 27. The hard water flowing through the pipe extending through resin bed 29 then flows through resin bed 30, through the perforations in plate 33, and finally to the exit 27.

When it is necessary to regenerate the ion exchange resin, a solenoid actuated valve 18 is opened allowing the brine solution contained in salt hopper 14 to flow into pipe 21, through valve 13, which is a two-way valve now rotated so that there is a passageway from pipe 21 to opening 27 on tank 12. At the same time two-way valve 10 is so rotated that there is a passageway from opening 26 on tank 12 to drain pipe 11. The brine solution from hopper 14 enters tank 12 by means of gravity flow and the volume of this solution is just sufficient to fill tank 12. After the ion exchange resin has been regenerated the excess salt solution is washed out by backwashing with fresh water. Two-way valves 10 and 13 are allowed to remain in the same position as for adding the brine solution and then a stream of fresh water is caused to flow through pipe 4 into pipe 21, through tank 12 and then to the drain through pipe 11. Since the regeneration, backwashing, and softening cycles using an ion exchange resin are well understood by those skilled in the art, those steps will not be described in any greater detail. As is true of such water softening apparatus in general the direction of flow of the brine solution and the backwash water into tank 12 is in a reverse direction to that of the hard water to be softened.

Referring again to FIGURE 1, illustrated schematically therein is a household appliance timer 24 connected with a power source 25. Controls 7 and 8 may also be connected with timer 24 if desired. Switch 23 described in greater detail below is adaptable for either manual operation as illustrated or may be connected to timer 24 electrically for automatic operation. Softened water flows from tank 12 through pipe 13a to the household appliance. Also as will be described in greater detail below when the salt hopper 14 becomes filled with brine solution overflow switch 19 opens interrupting current flowing through solenoid 22 allowing switch 23 to open. The closing of switch 23 causes a series of changes as will be pointed out later. Orifices 15, 16, and 40 are so chosen that the backwashing cycle is completed by the time salt hopper 14 is filled with water.

Brine hopper 14 is provided with a lid 35 which may be easily removed or replaced to facilitate the addition of salt thereto. As illustrated, lid 35 is provided with a hinge 36 and a handle 34 to facilitate opening and filling the salt hopper 14. FIGURES 4, 5 and 6 illustrate this feature. FIGURES 4 and 6 illustrate two different types of the salt hopper and brine supply valves that may be used. If the type illustrated in FIGURE 4 is used, tank 12 will be backwashed only during that period water is being added to salt hopper 14. On the other hand if the valve used is of the type illustrated in FIGURE 6 washwater can be passed through tank 12 independently of the flow of water into salt hopper 14. When the brine solution is to be withdrawn from salt hopper 14, valve stem 17 is lowered from its seat in FIGURE 4 by actuating valve 18. In FIGURE 6 water is added to salt hopper 14 by raising the valve stem 45 whereby the valve head 44 raises slightly off its seat due to the back pressure induced by orifice 40. Water can then flow through the channels 43 into salt hopper 14. When it is desired to withdraw the brine solution from hopper 14, the solenoid valve 18a is actuated whereby the valve head 44 is raised allowing the brine solution in hopper 14 to pass through channels 43 and valve 18a thence into pipe 21.

As previously mentioned, backwash water can be passed through valve 18a without filling salt hopper 14 if desired. This is accomplished by actuating the solenoid valve 18a whereby the valve stem 45 moves slightly downward exerting a force on a reinforcing member 42. The force on member 42 is exerted on the valve head 44 thus closing the channels 43. In this position of the valve 18a, water can be passed through the valve 18a and orifice 40 into pipe 21 without entering salt hopper 14.

Salt hopper 14 is also provided with a scupper 37 which encircles the upper interior end thereof. The scupper 37 is arranged to provide a means for opening switch 19 without permitting the salt solution to overflow the hopper 14. An overflow pipe 48 is connected at its upper end with the scupper 37. Its lower end is positioned so that brine passing therethrough will strike an extension of the lower blade of switch 19, thus opening switch 19. Switch 19 is normally in a closed position and is encased in a housing 46.

FIGURE 9 illustrates one arrangement of the switch 19 and pipe 48 in the housing 46. Also shown therein is an outlet 49 having a serrated exterior portion 50 which is adapted for connection with a pipe 20. Pipe 20 extends to a drain (not shown) wherein the overflow-brine would be discharged. Insulating members 56 and 57 are provided so that switch 19 is insulated from housing 46 and hopper 14. The blades of switch 19 are mounted by rivet 55 and bolts 53 and 54. Any suitable method may be utilized for mounting switch 19 and for attaching electric lines 51 and 52 thereto.

An important feature of the water softening apparatus of my invention is its compactness and efficiency making it particularly suitable for use with a household appliance such as an automatic washing machine, consequently the operation of my water softener will be described in conjunction with an automatic washing machine. After partially filling salt hopper 14 with salt the backwash and brine make-up switch 23 is closed. This can be accomplished either manually where the washing machine is of the type requiring the operator to measure the amount of water to be used or by the machine's timer if the machine is of the type that automatically supplies the correct amount of water. When the circuit is closed as a result of closing switch 23, valve 3 is actuated allowing untreated water to flow into pipe 4. At the same time the solenoids attached to valves 13 and 10 are actuated, so as to allow wash water to flow through line 21 into the top of water softening tank 12 through opening 27 and out of tank 12 through opening 26, and then through conduit 11 to the drain. The flow of wash water through tank 12 causes the salt solution used in the regeneration cycle to be flushed to the drain. When salt hopper 14 is filled with water it overflows through 48 causing the switch 19 to open thus interrupting the flow of current through solenoid 22 which allows the closing of switch 23, and in turn the closing of valve 3, and the rotation of two-way valves 10 and 13 so as to allow untreated water to flow into tank 12 where it is softened by ion exchange and from tank 12 the softened water flows to the washing machine. Following the last rinsing cycle of the washing machine the timer thereof actuates valve 17 opening it and at the same time rotates two-way valves 10 and 13 so as to allow the brine solution to flow into tank 12. The brine solution may be retained in tank 12 until it is desired to use the washer again. When the automatic washing machine is used again the foregoing cycle is repeated.

As to the size of the water softening tank 12 required that can be calculated from the following data:

FOR 100 GALLON CAPACITY

| Hardness (Gr. 1 gal.) | Diameter D (inches) | Height H (inches) |
| --- | --- | --- |
| 8 | 5 | 8 |
| 16 | 6 | 10 |
| 24 | 7 | 10½ |
| 32 | 8 | 11 |

FOR 200 GALLON CAPACITY

| 8 | 6 | 10 |
| --- | --- | --- |
| 16 | 7 | 10½ |
| 24 | 8 | 11 |
| 32 | 9 | 12 |

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. In water softening apparatus:
   a tank for water softening material, said tank having a pair of openings therein and including a plurality of beds of softening material arranged in parallel flow relationship;
   a hopper for a solution adapted to regenerate said material, said hopper including
      a hollow body portion adapted to hold said solution, and
      hopper valve means mounted on said body portion movable from a closed position retaining said solution in said hopper to an open position permitting said solution to flow therefrom;
   a first selector valve connected with one opening in said tank and with a consumer for the softened water;
   a second selector valve connected with the other opening in said tank and connected with a water drain;
   inlet valve means connected with said second selector valve and with a water supply source;
   a conduit connecting said second selector valve with said hopper valve means and with said hopper;
   orifice means in said conduit adjacent said hopper valve means creating a back-pressure in said conduit;
   metering means located in said conduit at the junction between said conduit and hopper, said metering means including an opening sized to permit water to flow from said conduit into said hopper at a rate depending upon the magnitude of pressure in said conduit simultaneously with flow through said orifice means;
   normally-closed switch means located on said hopper in communication with overflow means on the hopper and in a position to be opened by water overflowing said hopper;
   a manual switch electrically connected with said normally-closed switch means, said selector valves, and with said inlet valve means, said selector valves and inlet valve means being responsive to closure of said manual switch and normally-closed switch to move to a position permitting flow through said inlet valve means, conduit, into said hopper, through said first selector valve and tank, out of said tank through said second selector valve to the drain to flush said tank and fill said hopper and, responsive to the opening of said manual switch to reposition said inlet valve means and selector valves to permit flow through said inlet valve means, second selector valve, tank, and first selector valve to the consumer; and,
   timer means electrically connected with said hopper valve means and selector valves, said selector valves and hopper valve means being responsive to said timer means, after a predetermined time and when said manual switch is open, to reposition said selector valves and to open said hopper valve means permitting the regenerative solution to flow into said tank from said hopper.

2. In water softening apparatus:
   a tank for water softening material, said tank having a pair of openings therein and including a plurality of beds of softening material arranged in parallel flow relationship;
   a hopper for a solution adapted to regenerate said material, said hopper including
      a hollow body portion adapted to hold said solution, and
      hopper valve means mounted on said body portion including a valve member having a metering opening therein movable from a position retaining said solution in said hopper to a position permitting said solution to flow therefrom, and to a position wherein water flows through said metering opening into said hopper;
   a first selector valve connected with one opening in said tank with said hopper valve means, and with a consumer for the softened water;
   a second selector valve connected with the other opening in said tank and with a water drain;
   inlet valve means connected with said selector valve, with a water supply source and with said hopper valve means;
   orifice means located in a position in said hopper valve means to cause a back pressure in said hopper valve means, whereby said valve member is moved to the position wherein water flows through said metering opening into said hopper at a rate depending upon the magnitude of the pressure created by said orifice means;
   normally-closed switch means located on said hopper in communication with overflow means on the hopper and in a position to be opened by water overflowing said hopper;
   a manual switch electrically connected with said normally-closed switch means, said selector valves, and with said inlet valve means, said selector valves and inlet valve means being responsive to closure of said manual switch and normally-closed switch to move to a position permitting flow through said inlet valve means, through said orifice means in said hopper valve means moving said valve member to permit flow into said hopper, through said first selector valve and tank, out of second selector valve into said drain to flush said tank and simultaneously fill said hopper and, responsive to the opening of said manual switch to reposition said inlet valve means and selector valves to permit flow through said inlet valve means, second selector valve, tank, and first selector valve to the consumer; and,
   timer means electrically connected with said hopper valve means and selector valves, said selector valves and hopper valve means being responsive to said timer means after a predetermined time and when said manual switch is open, to reposition said selector valves and to move said valve member to the position wherein said hopper valve means permitting the regenerative solution to flow from said hopper into said tank.

(References on following page)

References Cited by the Examiner

UNITED STATES PATENTS

| | | | |
|---|---|---|---|
| 809,099 | 1/1906 | Desrumaux | 210—284 X |
| 1,088,929 | 3/1914 | Reisert | 210—284 X |
| 1,732,702 | 10/1929 | Tannehill | 210—140 X |
| 2,265,225 | 12/1941 | Clark | 210—140 X |
| 2,545,425 | 3/1951 | Fischer | 210—138 X |
| 2,878,867 | 3/1959 | Webb | 210—140 X |

REUBEN FRIEDMAN, *Primary Examiner.*

HERBERT L. MARTIN, *Examiner.*